(12) United States Patent
Kamakura

(10) Patent No.: US 8,281,376 B2
(45) Date of Patent: Oct. 2, 2012

(54) AUTHENTICATION SYSTEM AND AUTHENTICATION METHOD

(75) Inventor: Ken Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 12/540,451

(22) Filed: Aug. 13, 2009

(65) Prior Publication Data

US 2010/0058449 A1 Mar. 4, 2010

(30) Foreign Application Priority Data

Sep. 2, 2008 (JP) ................................. 2008-224507

(51) Int. Cl.
*H04L 29/00* (2006.01)
(52) U.S. Cl. ............................................... 726/6; 726/5
(58) Field of Classification Search ........................ None
See application file for complete search history.

(56) References Cited

U.S. PATENT DOCUMENTS 7,290,040 B2 * 10/2007 Newcombe et al. .......... 709/217
7,296,078 B2 * 11/2007 Sanchez Herrero et al. . 709/229

FOREIGN PATENT DOCUMENTS

JP 2000-311138 11/2000
JP 2000-322292 11/2000

* cited by examiner

*Primary Examiner* — Minh Dinh
(74) *Attorney, Agent, or Firm* — Staas & Halsey LLP

(57) ABSTRACT

An authentication system includes a plurality of personal authentication servers, a client terminal, a replacing portion and a renewing portion. The plurality of personal authentication servers store at least a part of enrolled data different from each other for user personal authentication and perform authentication with stored enrolled data according to authentication request from a client terminal. The client terminal stores identification information for specifying the personal authentication server storing each enrolled data, and requests an authentication to the personal authentication server specified with the identification information. The replacing portion replaces at least a part of the enrolled data between the plurality of personal authentication servers according to the authentication request condition to the plurality of personal authentication servers from the client terminal. The renewing portion renews the identification information according to the replacing result of the replacing portion.

15 Claims, 12 Drawing Sheets

FIG. 2

| USER ID | PASSWORD | AUTHENTICATION DATA |
|---------|----------|---------------------|
| takenaka | . . . . . . | . . . . . . |
| suzuki | . . . . . . | . . . . . . |
| sato | . . . . . . | . . . . . . |
| . . . . . . | . . . . . . | . . . . . . |
| . . . . . . | . . . . . . | . . . . . . |
| . . . . . . | . . . . . . | . . . . . . |
| . . . . . . | . . . . . . | . . . . . . |
| ⋮ | ⋮ | ⋮ |

FIG. 3

| USER ID | SERVER IDENTIFIER |
|---|---|
| takenaka | 192.168.0.1 |
| suzuki | 192.168.0.1 |
| ⋮ | ⋮ |
| nishioka | 192.168.0.2 |
| otohara | 192.168.0.2 |
| ⋮ | ⋮ |
| fujii | 192.168.0.3 |
| nomura | 192.168.0.3 |
| ⋮ | ⋮ |

FIG. 5

| DATE | SERVER IDENTIFIER | USER ID | NUMBER OF ACCESS |
|---|---|---|---|
| 2007/04/01 | 192.168.0.1 | ····· | 36 |
| 2007/04/01 | 192.168.0.1 | ····· | 2 |
| ⋮ | ⋮ | ⋮ | ⋮ |

| DATE | SERVER IDENTIFIER | USER ID | NUMBER OF ACCESS | AUTHENTICA-TION DATA |
|---|---|---|---|---|
| 2007/04/01 | 192.168.0.1 | ••••• | 87 | ••••• |
| 2007/04/01 | 192.168.0.1 | ••••• | 69 | ••••• |
| 2007/04/01 | 192.168.0.1 | ••••• | 67 | ••••• |
| ⋮ | ⋮ | ⋮ | ⋮ | ⋮ |

| | SERVER IDENTIFIER | USER ID | NUMBER OF ACCESS | AUTHENTICA-TION DATA |
|---|---|---|---|---|
| 2007/04/01 | 192.168.0.2 | ••••• | 4 | ••••• |
| 2007/04/01 | 192.168.0.2 | ••••• | 4 | ••••• |
| 2007/04/01 | 192.168.0.2 | ••••• | 3 | ••••• |
| ⋮ | ⋮ | ⋮ | ⋮ | ⋮ |

FIG. 7

| USER ID | DESTINATION SERVER IDENTIFIER | TRANSFERRING DATE |
|---------|-------------------------------|-------------------|
| takenaka | 192.168.0.1 | 2007/05/08 02:00 |
| suzuki | 192.168.0.3 | 2007/05/08 02:00 |
| sato | 192.168.0.5 | 2007/06/25 01:30 |
| ⋮ | ⋮ | ⋮ |

# AUTHENTICATION SYSTEM AND AUTHENTICATION METHOD

CROSS-REFERENCE TO RELATED APPLICATION

This application is based upon and claims the benefit of priority of the prior Japanese Patent Application No. 2008-224507, filed on Sep. 2, 2008, the entire contents of which are incorporated herein by reference.

FIELD

A certain aspect of embodiments described herein relates to an authentication system and an authentication method.

BACKGROUND

There is a case where a personal authentication system is adopted to a PC (Personal Computer) of a company staff in a company. In this case, it is often the case that enrolled data and a log data of a user is centralized in a viewpoint of efficiency of operation administration such as renewal of record information or uniform management of log. A system, in which a server for centralizing is connected to user terminals requesting authentication via a network, is hereinafter referred to as a client/server type.

Authentication operation of each user is concentrated at a start of business day or after a break time in a personal authentication system for securing PC security of a company. And so, a server may be added according to number increase of PC to be managed. It may take time to provide a service to a user when enrolled data number is large.

Japanese Patent Application Publication No. 2000-311138 (hereinafter referred to as Document 1) discloses a technology in which one of authentication servers is determined according to index searching of authentication request and thus authentication is performed. Japanese Patent Application Publication No. 2000-322292 (hereinafter referred to as Document 2) discloses a technology in which an authentication request requesting subdivided data is distributed to a computer node storing a master copy and a computer node storing a copy, according to load status.

However, the authentication request is concentrated to an overall controlling server when the authentication is requested, in the technology of Document 1 and Document 2. With the structure, a communication for an access to the distributed enrolled data may be a bottleneck.

And so, a cluster system having a shared disk device in which each server accesses the disk device may be structured by separating the disk device from the servers, and a plurality of disk devices having high-speed performance may be adapted to the cluster system as the shared disk device. However, a cost of the system may be increased and a burden of an operation administrator may be increased, because the shared disk device is essential.

SUMMARY

According to an aspect of the present invention, there is provided an authentication system including a plurality of personal authentication servers, a client terminal, a replacing portion and a renewing portion. The plurality of personal authentication servers store at least a part of enrolled data different from each other for user personal authentication and perform an authentication with the stored enrolled data according to an authentication request from a client terminal. The client terminal stores identification information for specifying the personal authentication server storing each enrolled data, and requests authentication to the personal authentication server specified with the identification information. The replacing portion replaces at least a part of the enrolled data between the plurality of personal authentication servers according to the authentication request condition to the plurality of personal authentication servers from the client terminal. The renewing portion renews the identification information according to the replacing result of the replacing portion.

According to another aspect of the present invention, there is provided an authentication method including: performing an authentication according to an authentication request with a plurality of personal authentication servers that store at least a part of enrolled data different from each other for user personal authentication; requesting an authentication to the personal authentication server specified with identification information for specifying the personal authentication server storing each enrolled data; replacing at least a part of the enrolled data between the plurality of personal authentication servers according to the authentication request condition to the plurality of personal authentication servers from the client terminal; and renewing the identification information according to replacing result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of enrolled data;

FIG. 3 illustrates an example of a destination IP address;

FIG. 5 illustrates an example of calculation result of access number of each user for a given time;

FIG. 7 illustrates an example of destination administration table;

DESCRIPTION OF EMBODIMENTS

The following is a description of embodiments of the present invention, with reference to the accompanying drawings.

[a] First Embodiment

Figure 1:
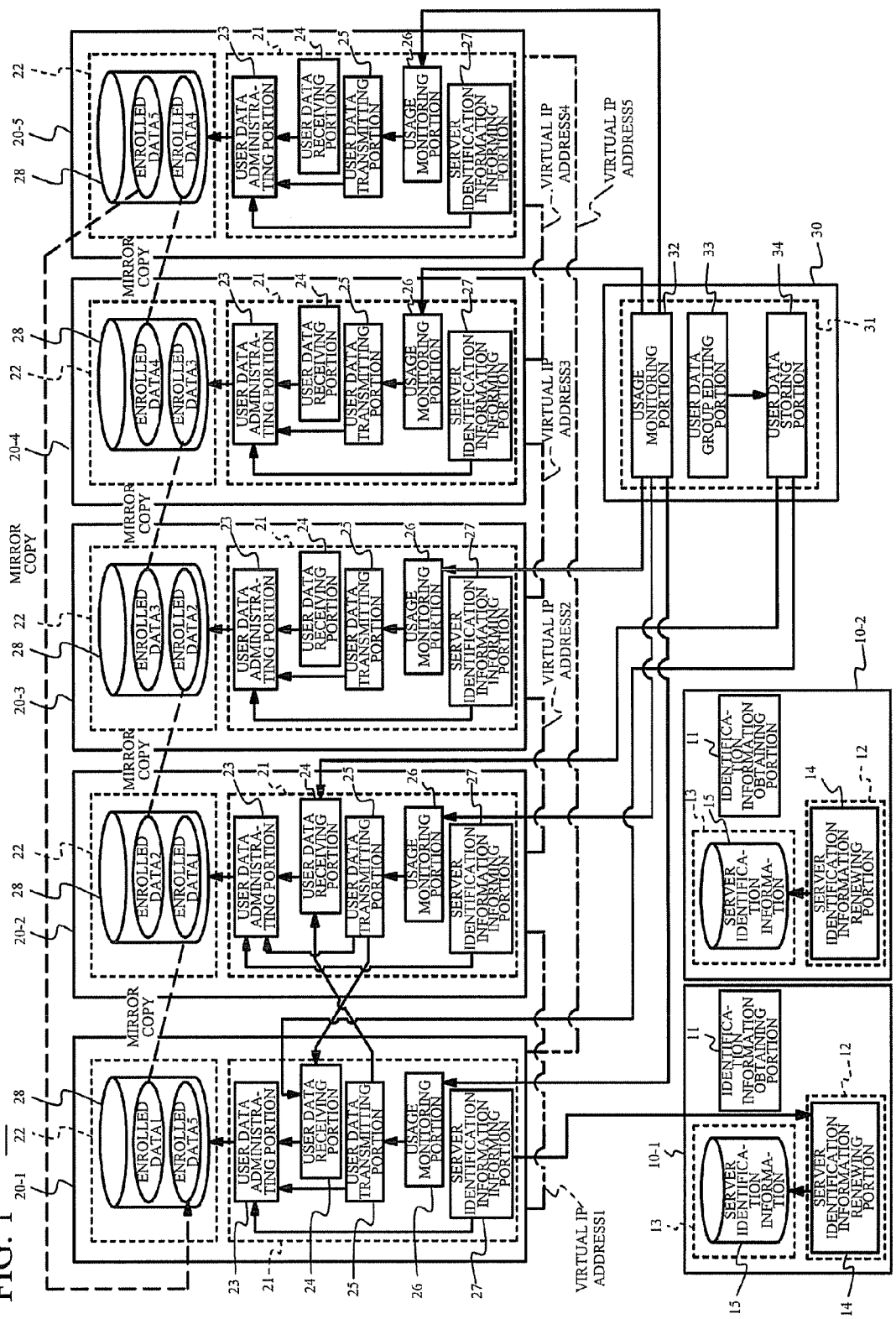
FIG. 1 illustrates a block diagram of an authentication system in accordance with a first embodiment.

[System Structure] FIG. 1 illustrates a block diagram of an authentication system 100 in accordance with a first embodiment. As illustrated in FIG. 1, the authentication system 100 has a plurality of client terminals 10, a plurality of personal authentication servers 20, and an administrator PC 30. In the embodiment, there are two client terminals 10 (client terminals 10-1 and 10-2), and there are five personal authentication servers 20 (personal authentication servers 20-1 through 20-5). The client terminal 10, the personal authentication server 20 and the administrator PC 30 are coupled to each other via a network and may communicate with each other. The network may be a communication network such as public circuit, Internet, or an intranet.

The client terminals 10-1 and 10-2 respectively include an identification-information obtaining portion 11, a CPU (Central Processing Unit) 12, and a memory 13. The identification-information obtaining portion 11 is a device for obtaining information necessary for personal authentication. For example, the identification-information obtaining portion 11 may be a sensor for obtaining biometric information such as fingerprint or an input device for inputting a password. A server-identification-information renewing portion 14 is generated when the CPU 12 executes an authentication program for performing an authentication method. The memory 13 has a volatile memory and/or a nonvolatile memory, and acts as a server-identification-information storing portion 15.

The personal authentication servers 20-1 through 20-5 respectively have a CPU 21 and a memory 22. A user data administrating portion 23, a user data receiving portion 24, a user data transmitting portion 25, a usage monitoring portion 26, and a server-identification-information informing portion 27 are generated when the CPU 21 executes the authentication program. The memory 22 has a volatile memory and/or a nonvolatile memory, and acts as a enrolled data storing portion 28.

The administrator PC 30 has a CPU 31 and so on. A usage monitoring portion 32, a user-data-group editing portion 33 and a user data recording portion 34 are generated when the CPU 31 executes the authentication program.

[Editing of Record Data] Next, a description will be given of recording of authentication data of each user. The user-data-group editing portion 33 relates a plurality of groups of authentication data (for example, enrolled data 1 to 5) to the personal authentication servers 20-1 to 20-5. A system administrator may determine the recorded groups 1 to 5 in advance. FIG. 2 illustrates an example of the enrolled data 1.

Next, the user data recording portion 34 transmits a enrolled data related by the user-data-group editing portion 33 to the related one of the personal authentication servers 20. The user data receiving portion 24 of the related personal authentication server 20 receives the user data transmitted by the user data recording portion 34. Thus, the enrolled data storing portion 28 stores the user data via the user data administrating portion 23. The user data transmitting portion 25 of one of the personal authentication servers 20 transmits a data for mirror copy to another personal authentication server 20, when each of the user data is stored. The administrator informs the user or the client terminal 10 of an IP address of record destination, when the enrolled data is stored.

FIG. 3 illustrates an example of the IP address of the record destination. In FIG. 3, (192.168.0.1) indicates the personal authentication server 20-1, (192.168.0.2) indicates the personal authentication server 20-2, (192.168.0.3) indicates the personal authentication server 20-3. The server-identification-information storing portion 15 stores the IP address of record destination.

In the embodiment, the enrolled data storing portion 28 of the personal authentication server 20-1 stores the enrolled data. Each of the enrolled data storing portions 28 of the personal authentication servers 20-2 to 20-5 stores the enrolled data 2 to 5 respectively. Thus, each of the personal authentication servers 20 does not record all of the user data, but records a part of the enrolled data of all users. Each of the personal authentication servers 20 stores at least a part of the enrolled data different from each other.

The enrolled data storing portion 28 of the personal authentication server 20-1 receives an instruction from the user data administrating portion 23, and stores a mirror copy of the enrolled data 5. Similarly, each of the enrolled data storing portions 28 of the personal authentication servers 20-2 to 20-5 stores a mirror copy of the enrolled data 1 to 4. Therefore, each of the enrolled data storing portions 28 stores two of the enrolled data 1 to 5. A mirroring time is reduced, by limiting the number of the enrolled data stored in each of the enrolled data storing portions 28.

Each two of the personal authentication servers 20 stores each of the enrolled data, in accordance with the above-mentioned mirroring. In this case, the same processing is performed, when any one of the two personal authentication servers 20 is accessed. A virtual IP address is allocated to each two of the personal authentication servers 20 in addition to the IP address for identifying each personal authentication server 20. Thus, a load balancer of each personal authentication server 20 distributes a load. With the structure, a personal authentication service is performed even if one of the two personal authentication servers 20 goes down. The load balancer distributes the load with a general method.

Figure 4:
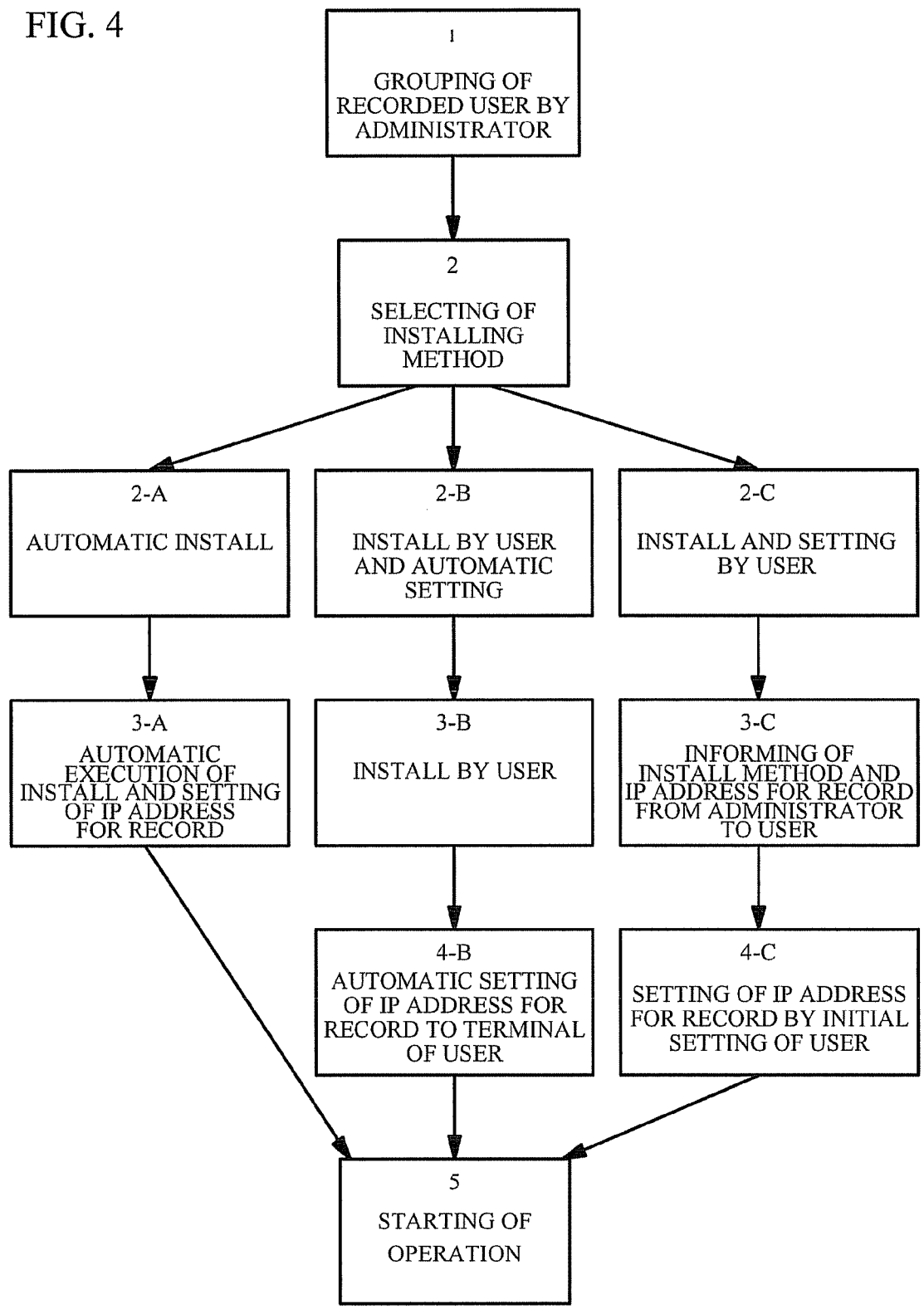
FIG. 4 illustrates a flowchart of a method of installing of an application of a client terminal.

[Installing of application] FIG. 4 illustrates a method of installing of an application of the client terminal 10. The method of installing may be selected according to an operation condition of the authentication system 100 or a cost of the system.

As illustrated in FIG. 4, an administrator selects a method of installing. An application for personal authentication is automatically installed in each client terminal 10, when the administrator selects an automatic installing. In this case, the server-identification-information storing portion 15 automatically stores a virtual IP address of an enrolled data including a user using each of the client terminals 10.

A user installs an application for personal authentication in each of the client terminal 10, when the user individually installs the application and selects an automatic setting. After that, the server-identification-information storing portion 15 of the client terminal 10 automatically stores a virtual IP address of a enrolled data including a user using the client terminal 10.

The administrator informs the user of the virtual IP address of the group including the user using each of the client terminals 10 with e-mail in advance, when each user individually installs the application and selects manual setting. The user operates the server-identification-information storing portion 15 to store the informed virtual IP address, after installing the application for personal authentication in the client terminal 10.

[Replacing of enrolled data] Next, a description will be given of replacing of enrolled data. The usage monitoring portion 26 of each personal authentication server 20 calculates authentication request for a given time (for example a month) of a user included in the enrolled data stored in the enrolled data storing portion 28. FIG. 5 illustrates an example of the calculation result. For example, the access number of each user for a predetermined time is obtained as a calculation result.

Each of the usage monitoring portions 26 transmits the calculation result to the usage monitoring portion 32 of the administrator PC 30. The usage monitoring portion 32 calculates the calculation result received from each of the usage monitoring portions 26. The usage monitoring portion 32 indicates each of the user data administrating portions 23 so that the enrolled data is replaced and access number difference of each user is reduced between each of the personal authentication server 20.

Figure 6:
FIG. 6 illustrates an example of replacement of enrolled data.

For example, the usage monitoring portion 32 identifies users of higher access number (for example, top ten users) of the personal authentication server 20 accessed most. Further, the usage monitoring portion 32 identifies users of lower access number (for example, worst ten users) of the personal authentication server 20 accessed least. The usage monitoring portion 32 indicates each of the user data administrating portions 23 so as to replace the enrolled data of the top ten users with the enrolled data of the worst top ten users. Therefore, the enrolled data stored in the enrolled data storing portion 28 is replaced via the user data transmitting portion 25 and the user data receiving portion 24. FIG. 6 illustrates an example of replacing of the enrolled data.

In this case, the usage monitoring portion 32 may determine a time of the above-mentioned replacing. For example, the usage monitoring portion 32 may indicate the above-mentioned replacing during a time of fewer access numbers of users.

The usage monitoring portion 32 records the transferred users, the destination virtual IP address, transferring date and so on in a destination administration table stored by the user data administrating portion 23 of a source personal authentication server 20. FIG. 7 illustrates an example of the destination administration table. The server-identification-information informing portion 27 obtains the destination server identification information from the user data administrating portion 23, and transmits the destination server identification information to the server-identification-information renewing portion 14 of the client terminal 10. The server-identification-information renewing portion 14 renews the server identification information, and automatically accesses the destination personal authentication server 20 again. With the method, the client terminal 10 may access the destination personal authentication server 20 during a personal authentication after that.

With the repetition of the above-mentioned replacing of the enrolled data, the access number of user is averaged between each of the personal authentication servers 20. Therefore, higher usage users are distributed. And the enrolled data is arranged according to the operation circumstance. The method of averaging of the access number is not specifically limited.

Figure 8:
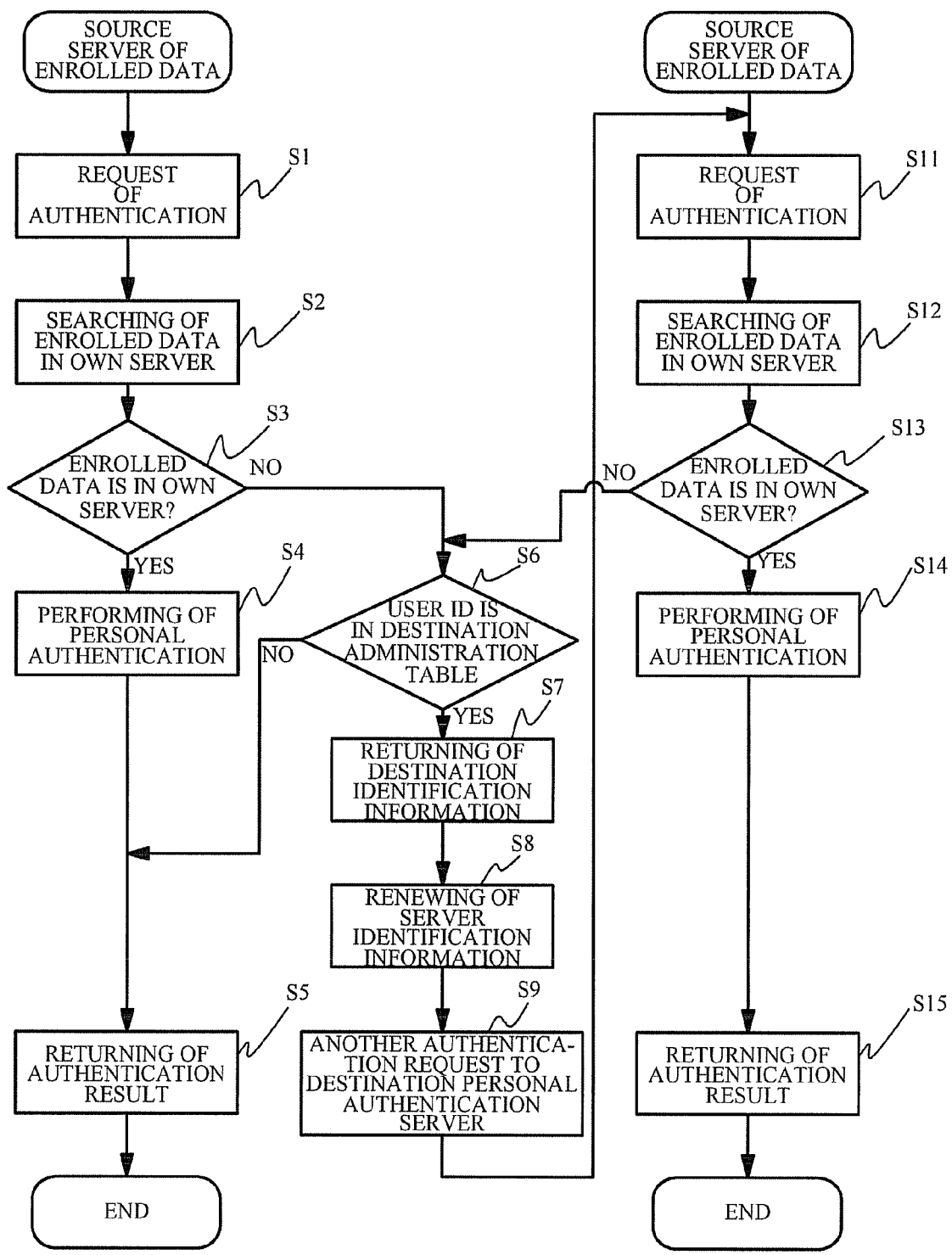
FIG. 8 illustrates a personal authentication flow after transfer of enrolled data.

FIG. 8 illustrates a personal authentication flow after transferring the enrolled data. FIG. 8 illustrates a flow chart in a case where the enrolled data of a user A is transferred from the enrolled data storing portion 28 of the personal authentication server 20-1 to the enrolled data storing portion 28 of the personal authentication server 20-3.

As illustrated in FIG. 8, the client application of the client terminal 10 requests the personal authentication server 20-1 an authentication of the user A (Step S1). In this case, the user data administrating portion 23 of the personal authentication server 20-1 searches the enrolled data of the enrolled data storing portion 28 of its own server (Step S2). Next, the user data administrating portion 23 determines whether there is the enrolled data of the user A (Step S3).

If it is determined that there is the enrolled data of the user A in Step S3, the personal authentication is performed (Step S4). In this case, it is determined whether an input password corresponds to a recorded password or detected biometric information corresponds to recorded biometric information. After that, the server-identification-information informing portion 27 returns an authentication result to the client application (Step S5). After that, the flowchart is terminated.

If it is not determined that there is the user data in Step S3, the user data administrating portion 23 determines whether there is an user ID of the user A in the destination administration table (Step S6). If it is not determined that there is the user ID of the user A, Step S5 is executed.

If it is determined that there is the user ID in Step S6, the server-identification-information informing portion 27 returns the destination identification information to the client application (Step S7). Next, the client application renews the server identification information stored in the server-identification-information renewing portion 14 (Step S8). Then, the client application requests another authentication of the destination personal authentication server 20 (Step S9). Here, the personal authentication server 20-3 is requested of the authentication.

Next, the client application requests authentication of the personal authentication server 20-3 (Step S11). In this case, the user data administrating portion 23 of the personal authentication server 20-3 searches the enrolled data of the enrolled data storing portion 28 of its own server (Step S12). Next, the user data administrating portion 23 determines whether there is the enrolled data of the user A (Step S13).

If it is determined that there is the enrolled data of the user A in Step S13, the personal authentication is performed (Step S14). After that, the server-identification-information informing portion 27 of the personal authentication server 20-3 returns the authentication result to the client application (Step S15). After that, the flowchart is terminated. If it is not determined that there is the enrolled data of the user A in Step S13, the user data administrating portion 23 of the personal authentication server 20-3 executes Step S6.

With the flowchart of FIG. 8, the personal authentication is performed in the destination personal authentication server, even if the enrolled data is transferred. The client terminal 10 can access the destination personal authentication server 20 without accessing a specific server, because the client terminal stores the server identification information. Therefore, the access concentration from each client terminal to a specific server is restrained.

With the authentication system 100 in accordance with the embodiment, it is possible to restrain an authentication request concentration, because the enrolled data is distributed to a plurality of the personal authentication servers. And it is possible to restrain the communication concentration to a specific server, because the enrolled data of higher usage user is distributed. This results in a speed-up of the personal authentication. And it is possible to restrain cost-up because it is not necessary to provide a shared disk device newly.

In the embodiment, the usage monitoring portions 26 and 32 act as a replacing portion, the server-identification-information renewing portion 14 acts as a renewing portion and a determining portion, and the user data administrating portion 23 acts as a duplicating portion.

The client terminal 10 may store information as to a plurality of servers to be requested of an authentication with respect to each user and priority information determined by the administrator, and may select a server to be connected from the plurality of the servers when the client terminal 10 is connected to the personal authentication server. For example, the client terminal 10 may search the plurality of the personal authentication servers 20 according to the server identification information priority, and may transmit an authentication request at a time when the client terminal 10 finds out accessible one of the personal authentication server. Therefore, the personal authentication server 20 may not have a function such as a load balancer using a virtual IP address. In this case, the server-identification-information renewing portion 14 acts as a priority determining portion.

The client terminal 10 may store a plurality of server identification information by a user group. For example, the client terminal 10 may store server identification information different from each other by a user group. In this case, it is possible to distribute a group including relatively few users having high access rate to a plurality of personal authentication servers 20.

The client terminal 10 may store the plurality of server identification information by a user. For example, the client terminal 10 may store a plurality of server identification information with respect to each user. In this case, it is possible to distribute users of higher access rate to a plurality of the personal authentication servers 20 in advance.

The enrolled data may be replaced according to communication performance between the client and the server, when the personal authentication servers 20-1 to 20-5 are not located at a same site and are distributed to a plurality of floors. For example, each of the usage monitoring portions 26 may measure the communication performance (communication speed) toward the client terminal 10 and store obtained information for a given time when the client terminal 10 requests authentication to determine the timing. In this case, the usage monitoring portion 26 acts as a measuring portion.

The usage monitoring portion 32 of the administrator PC 30 calculates the measuring result. Further, the usage monitoring portion 32 replaces enrolled data of a user of high number of authentication request to one of the personal authentication servers 20 having low communication speed with another enrolled data of another user of low number of authentication request to another personal authentication server 20 having high communication speed. In this case, it is possible to avoid a condition that a specific network is busy for a specific time and improve performance of a whole system.

The enrolled data may be replaced according to the client terminal 10 used by a specific user. Here, there is a case where a user accesses the personal authentication server 20 from different points. In this case, the access performance of one of the two client terminals 10 may be improved because of the transferring of the enrolled data. On the other hand, the access performance of the other may be degraded. It is possible to improve the situation if the usage monitoring portion 32 of the administrator PC 30 excepts the users accessing from a plurality of the client terminals 10 at the replacing of groups. In this case, it is possible to improve the performance of the system even if the plurality of the client terminals 10 with which the same user uses are physically distributed in an operation circumstance.

The enrolled data may be replaced according to the user using a specific client terminal 10. If a plurality of users use the same client terminal 10, a response of the client terminal 10 may be degraded according to time where the users use the client terminal 10 because of the transferring of the enrolled data. It is possible to improve the situation if the usage monitoring portion 32 of the administrator PC 30 excepts the users accessing from the client terminals 10 at the replacing of groups. In this case, it is possible to improve the performance of the system even if the time where the users use the client terminal is changed.

[b] Second Embodiment

Figure 9:
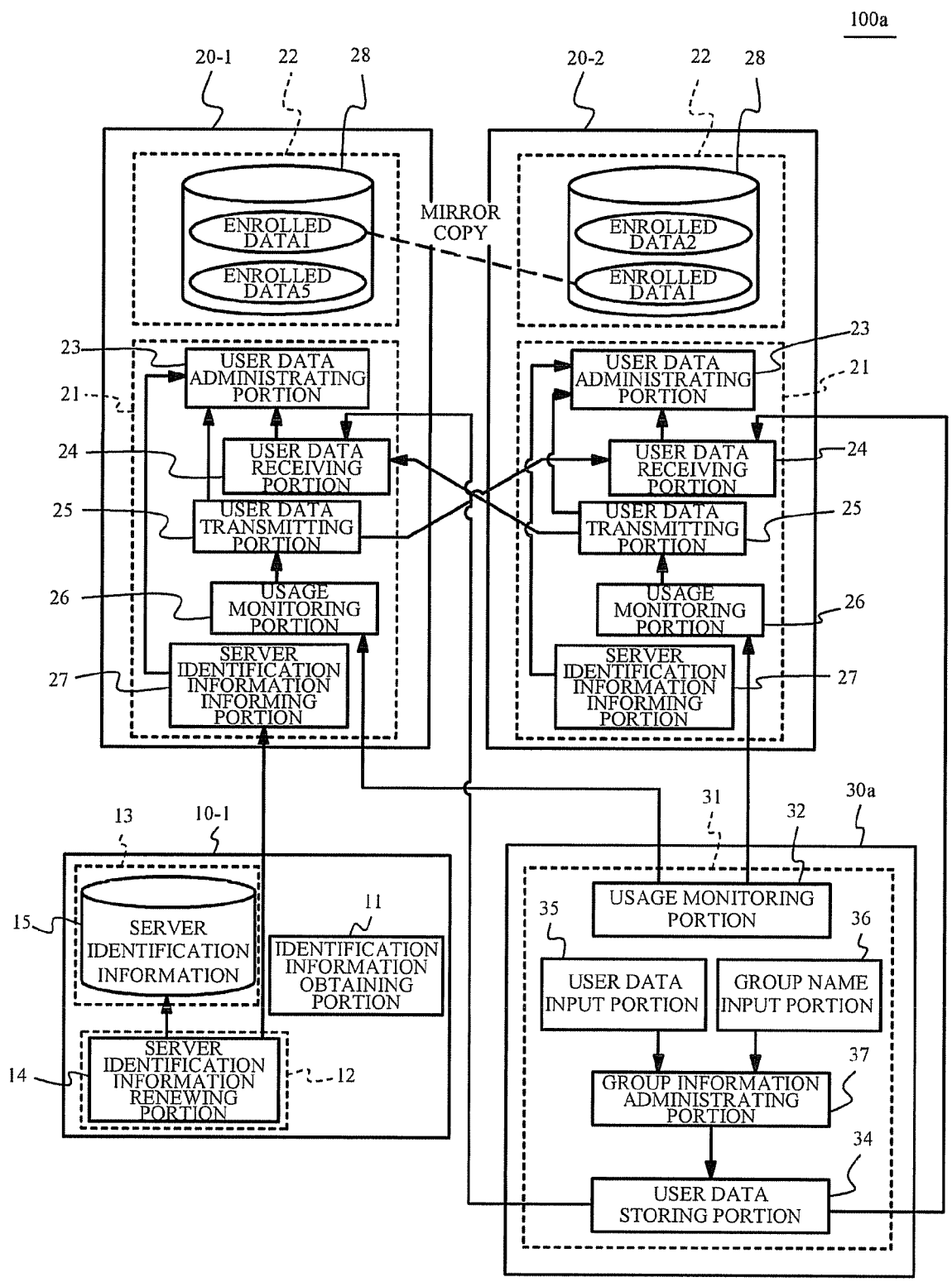
FIG. 9 illustrates a schematic view of an authentication system in accordance with a second embodiment.

FIG. 9 illustrates a schematic view of an authentication system 100*a* in accordance with a second embodiment. The authentication system 100*a* is different from the authentication system 100 in a point that an administrator PC 30*a* is provided instead of the administrator PC 30. The administrator PC 30*a* is different from the administrator PC 30 in a point that a user data inputting portion 35, a group name inputting portion 36 and a group information administrating portion 37 are provided instead of the user-data-group editing portion 33. The CPU 31 generates the user data inputting portion 35, the group name inputting portion 36 and the group information administrating portion 37 by executing an authentication program in accordance with the second embodiment.

The user data inputting portion 35 obtains user data other than group information. The group name inputting portion 36 obtains a group name of each personal authentication server 20. The group information administrating portion 37 divides all users data by number of the personal authentication server 20 into enrolled data and determines a group name of each enrolled data. The group information administrating portion 37 determines a group name until there are no residual enrolled data, if there is a residual enrolled data. The enrolled data having a group name is transmitted from the user data recording portion 34 to each of the personal authentication servers 20.

With the embodiment, it is possible to divide the enrolled data to be recorded in the personal authentication server 20 into groups automatically.

The group information administrating portion 37 may allocate a plurality of groups to a specific personal authentication server 20. The group information administrating portion 37 may allocate a user not belonging to a group so that user number allocated to each personal authentication server 20 is equalized. The user data to be recorded in each personal authentication server 20 may be divided to groups and managed with existing group attribute information.

The group information administrating portion 37 may allocate a new user to an adequate group automatically when it is necessary to add the new user. For example, the usage monitoring portion 32 may select a plurality of servers used averagely according to a usage analysis result of a personal authentication server and may transmit identification information of the selected servers to the group information administrating portion 37. The group information administrating portion 37 may allocate the same group to the selected servers by mirroring and may select a group including relatively few users by priority.

In this case, the group information administrating portion 37 determines group information and enters the group information to a specific personal authentication server 20. The group information administrating portion 37 obtains identification information of the personal authentication server 20 recording the user and informs the user of the identification information. It is therefore possible to avoid a group to be replaced later and to allocate groups for user recording automatically.

In the embodiment, the group information administrating portion 37 acts as a distributing portion.

[c] Third Embodiment

Figure 10:
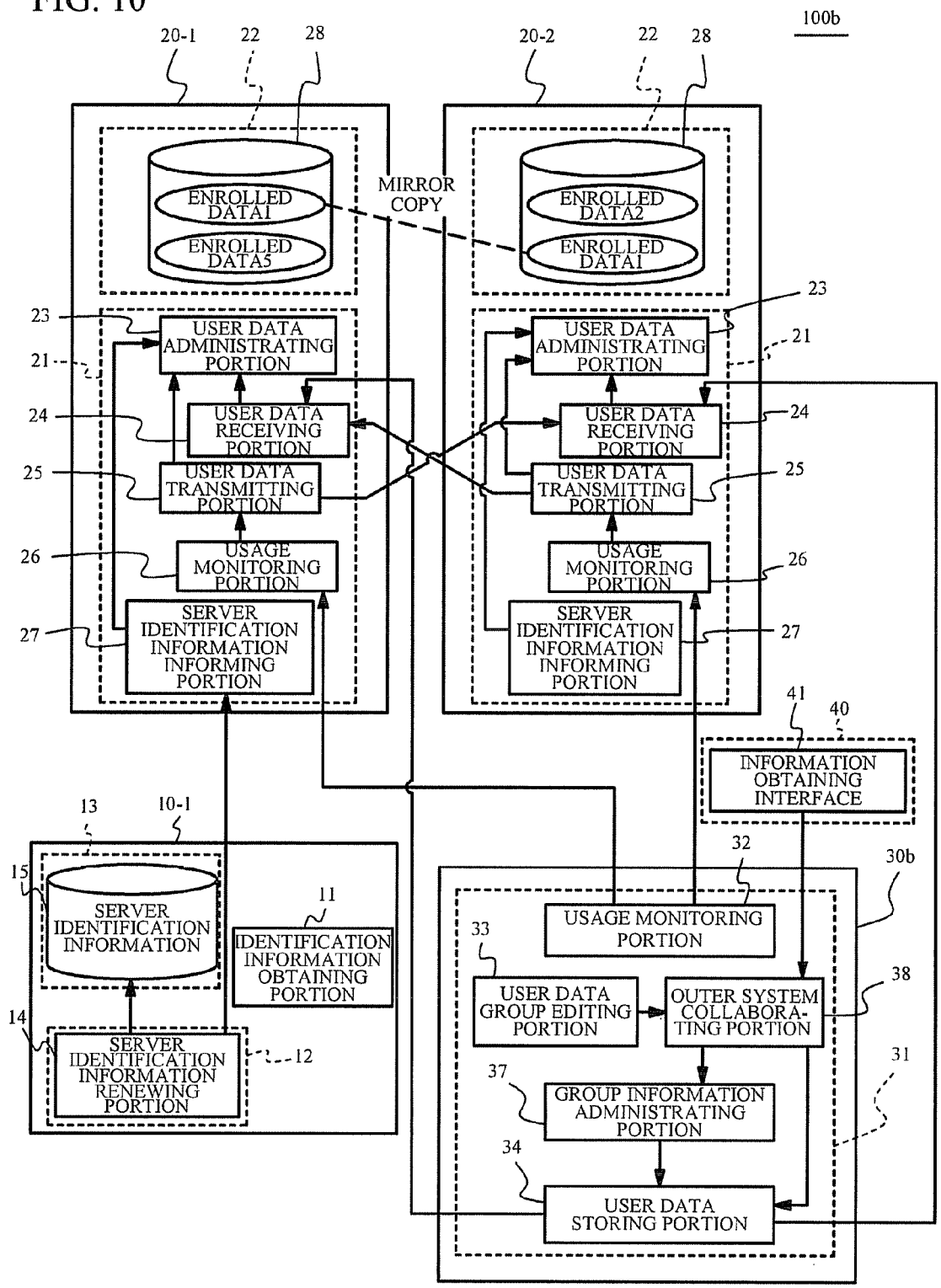
FIG. 10 illustrates a schematic view of an authentication system in accordance with a third embodiment.

FIG. 10 illustrates a schematic view of an authentication system 100*b* in accordance with a third embodiment. The authentication system 100*b* has an administrator PC 30*b* instead of the administrator PC 30 and has an external system 40, being different from the authentication system 100. The external system 40 is, for example, a directory server or the like.

The administrator 30*b* has a group information administrating portion 37 and an external-system-collaborating portion 38, being different from the administrator PC 30. The CPU 31 generates the group information administrating portion 37 and the external-system-collaborating portion 38 by executing an authentication program in accordance with the third embodiment.

The external-system-collaborating portion 38 receives user information via an information obtaining interface 41 of the external system 40, in the authentication system 100b. The user-data-group editing portion 33 may relate the user data to the personal authentication system. The user data recording portion 34 may calculate the user data and the group data matching with the authentication system 100b and enter the calculated user data and group data to each personal authentication server.

With the embodiment, it is possible to use information of an external system such as a directory server when a new personal authentication method such as a biometric authentication is adopted.

In the embodiment, the external-system-collaborating portion 38 acts as a collaborating portion.

[d] Fourth Embodiment

Figure 11:
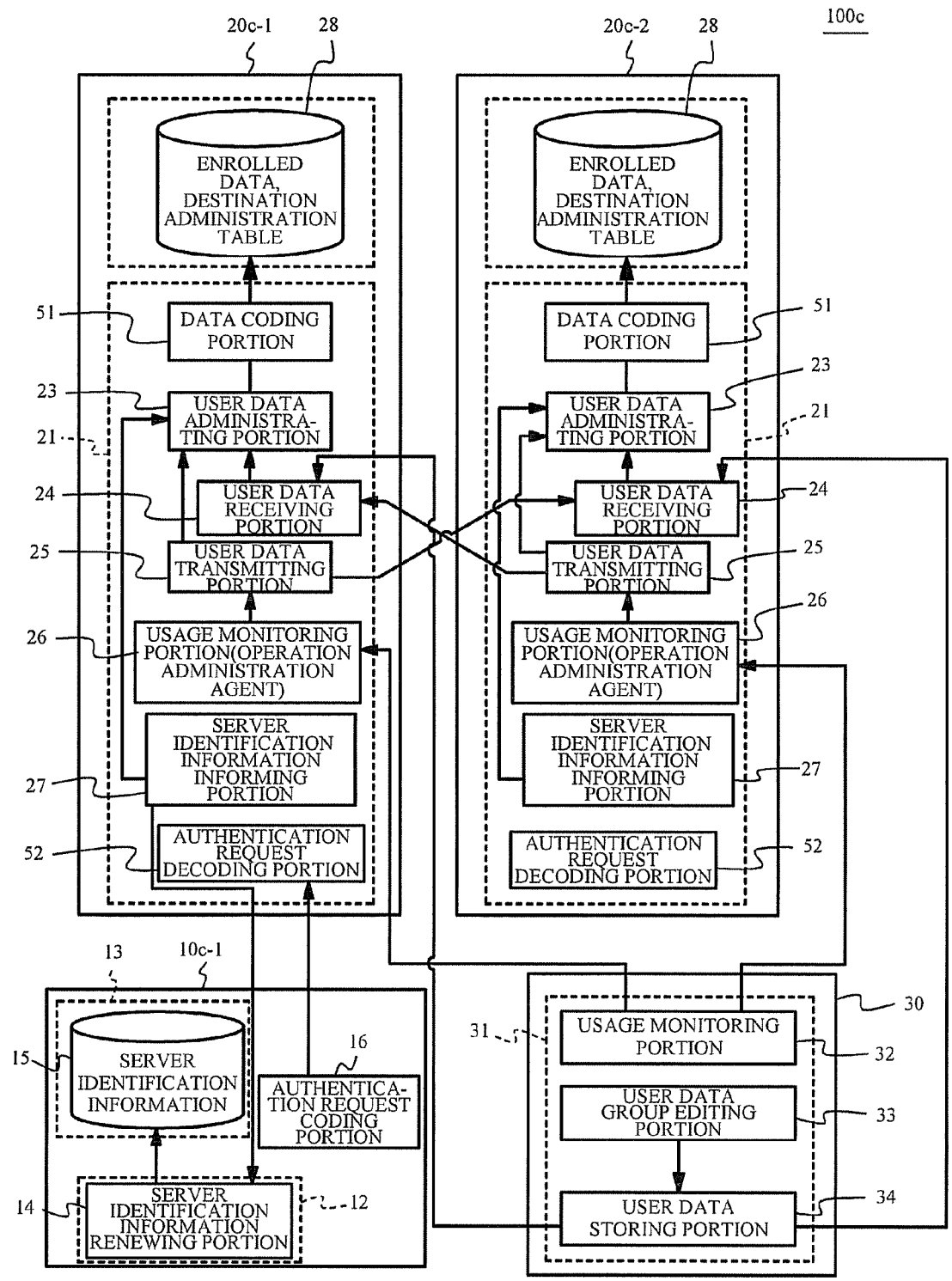
FIG. 11 illustrates a schematic view of an authentication system in accordance with a fourth embodiment.

FIG. 11 illustrates a schematic view of an authentication system 100c in accordance with a fourth embodiment. The authentication system 100c has a personal authentication server 20c instead of the personal authentication server 20, and has a client terminal 10c instead of the client terminal 10. Each personal authentication server 20c has a data coding/decoding portion 51 and an authentication request decoding portion 52. The client terminal 10c has an authentication request coding portion 16. The CPU 21 of the personal authentication server 20c generates the data coding/decoding portion 51 and the authentication request decoding portion 52 by executing an authentication program in accordance with the fourth embodiment. The CPU 31 of the client terminal 10c generates the authentication request coding portion 16 by executing the authentication program in accordance with the fourth embodiment.

In the embodiment, it is prevented that an exterior client terminal pretends to be the client terminal 10c and requests authentication, because the enrolled data, the destination administration table, and the data for the authentication are coded. For example, the authentication request coding portion 16 codes the data used for the authentication request of the client terminal 10c. The authentication request decoding portion 52 decodes the coded data before the personal authentication server 20c processes the authentication request. The data coding/decoding portion 51 codes the user data and the destination administration table when the data coding/decoding portion 51 records the user data and renews the destination administration table. The data coding/decoding portion 51 decodes the coded data when the coded data is used.

It is possible to prevent the pretending authentication request by coding the enrolled data, the destination administration table, and the data used for the authentication requested by the client.

In the embodiment, the authentication request coding portion 16 and the data coding/decoding portion 51 act as a coding portion.

[e] Fifth Embodiment

Figure 12:
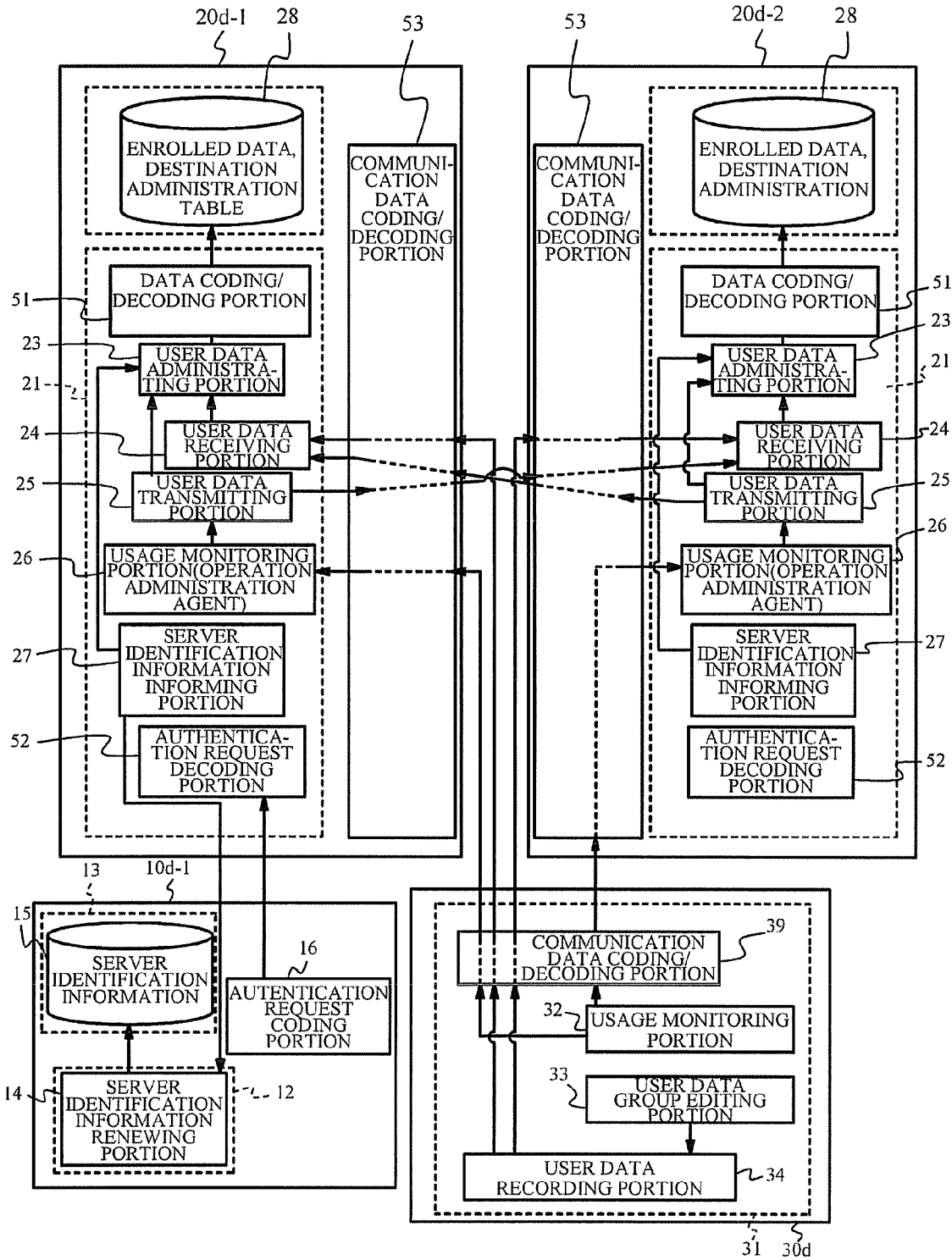
FIG. 12 illustrates a schematic view of an authentication system in accordance with a fifth embodiment.

FIG. 12 illustrates a schematic view of an authentication system 100d in accordance with a fifth embodiment. The authentication system 100d has a personal authentication server 20d instead of the personal authentication server 20, has an administrator PC 30d instead of the administrator PC 30, and has a client terminal 10d instead of the client terminal 10. The client terminal 10d has the same structure as the client terminal 10c. The personal authentication server 20d has a communication data coding/decoding portion 53 in addition to the personal authentication server 20c. The administrator PC 30d further has a communication data coding/decoding portion 39. The CPU 21 of the personal authentication server 20 generates the communication data coding/decoding portion 53 by executing an authentication program in accordance with the fifth embodiment. The CPU 31 of the administrator PC 30 generates the communication data coding/decoding portion 39 by executing an authentication program in accordance with the fifth embodiment.

In the embodiment, the data is coded or decoded at the communication data coding/decoding portions 53 and 39 on the communication between the administrator PC 30d and the personal authentication server 20d. The data is coded or decoded at the communication data coding/decoding portion 39 on the communication between each of the personal authentication servers 20d. Therefore, falsification of data is prevented.

In the embodiment, the authentication request coding portion 16, the data coding/decoding portion 51 and the communication data coding/decoding portions 39, 53 act as a coding portion.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An authentication system comprising:
a plurality of personal authentication servers that store at least a part of enrolled data different from each other for user personal authentication and perform authentication with the stored enrolled data according to an authentication request from a client terminal;
a client terminal that stores identification information for specifying one of the plurality of personal authentication servers storing each enrolled data, and requests an authentication to the personal authentication server specified with the identification information;
a replacing portion that replaces at least a part of the enrolled data between the plurality of personal authentication servers according to a condition of the authentication request to the plurality of personal authentication servers from the client terminal; and
a renewing portion that renews the identification information according to the replacing result of the replacing portion.

2. The authentication system as claimed in claim 1, wherein the authentication request condition is the number of authentication request to the personal authentication server for a given time.

3. The authentication system as claimed in claim 2, wherein the replacing portion replaces the enrolled data between the plurality of the personal authentication servers so that a difference of the number of authentication request between each personal authentication server is reduced.

4. The authentication system as claimed in claim 1 further comprising a distributing portion that distributes the enrolled data to the plurality of the personal authentication servers.

5. The authentication system as claimed in claim 4, wherein the distributing portion divides the enrolled data into groups including a part of the enrolled data overlapping with each other, and distributes the groups to the plurality of the personal authentication servers.

6. The authentication system as claimed in claim 4 further comprising a collaborating portion that collaborates with an external system administrating user information,
   wherein the distributing portion distributes the enrolled data into the plurality of the personal authentication servers according to group information managed by the external system.

7. The authentication system as claimed in claim 1 further comprising a duplicating portion that duplicates the enrolled data stored by one of the personal authentication servers to another personal authentication server.

8. The authentication system as claimed in claim 7, wherein the client terminal has a determining portion that determines one personal authentication server for authentication request from the plurality of the personal authentication servers specified with the identification information.

9. The authentication system as claimed in claim 8 further comprising a priority determining portion that determines priority of the personal authentication servers specified with the identification information,
   wherein the determining portion determines the personal authentication server for the authentication request according to the priority.

10. The authentication system as claimed in claim 9, wherein the priority determining portion determines the priority of the personal authentication servers specified with the identification information by a user group.

11. The authentication system as claimed in claim 9, wherein the priority determining portion determines the priority of the personal authentication servers specified with the identification information by a user.

12. The authentication system as claimed in claim 1, wherein the distributing portion distributes new enrolled data so that a difference of the number of enrolled data between each personal authentication server is reduced.

13. The authentication system as claimed in claim 1, wherein the replacing portion replaces the enrolled data between the plurality of the personal authentication servers every given time interval.

14. The authentication system as claimed in claim 1 further comprising an encoding portion that encodes at least a part of enrolled data stored in the plurality of the personal authentication servers.

15. An authentication method comprising:
   performing an authentication according to an authentication request with a plurality of personal authentication servers that store at least a part of enrolled data different from each other for user personal authentication;
   requesting an authentication to one of the plurality of personal authentication servers that is specified with identification information for specifying a personal authentication server storing each enrolled data;
   replacing at least a part of the enrolled data between the plurality of personal authentication servers according to a condition of the authentication request to the plurality of personal authentication servers from the client terminal; and
   renewing the identification information according to replacing result.

\* \* \* \* \*